United States Patent

Fayard et al.

[11] Patent Number: 5,919,510
[45] Date of Patent: Jul. 6, 1999

[54] METHOD FOR MANUFACTURING FROZEN AERATED PRODUCTS

[75] Inventors: Gilles Fayard, Le Mont S/Lausanne; Michel John Arthur Groux, Lauperswil, both of Switzerland

[73] Assignee: Nestec S.A., Vevey, Switzerland

[21] Appl. No.: 08/558,635

[22] Filed: Nov. 14, 1995

[30] Foreign Application Priority Data

Nov. 23, 1994 [EP] European Pat. Off. ............. 94118379

[51] Int. Cl.$^6$ .......................... A23G 9/04; A23G 9/20
[52] U.S. Cl. ............... 426/565; 426/566; 426/567; 426/516; 426/524; 62/306; 62/342; 62/343
[58] Field of Search ................... 426/565–567, 426/516, 517, 524, 249, 448, 449, 100, 101; 62/806, 342, 343; 366/149; 425/204

[56] References Cited

U.S. PATENT DOCUMENTS

| | | | |
|---|---|---|---|
| 3,647,478 | 3/1972 | Minor et al. | 99/137 |
| 3,764,238 | 10/1973 | Carpigiani | 418/15 |
| 3,914,440 | 10/1975 | Witzig | 426/130 |
| 4,020,643 | 5/1977 | Roberts et al. | 62/322 |
| 4,031,261 | 6/1977 | Durst | 426/565 |
| 4,219,581 | 8/1980 | Dea et al. | 426/565 |
| 4,504,511 | 3/1985 | Binley | 426/565 |
| 4,507,326 | 3/1985 | Tarantino | 426/101 |
| 4,713,256 | 12/1987 | Chaveron et al. | 426/631 |
| 4,737,372 | 4/1988 | Bender et al. | 426/5 |
| 4,758,097 | 7/1988 | Iles, Sr. | 366/149 |
| 4,783,104 | 11/1988 | Butcher et al. | 426/249 |
| 4,795,650 | 1/1989 | Groobert | 426/306 |
| 4,816,278 | 3/1989 | Sasamoto et al. | 426/513 |
| 4,859,484 | 8/1989 | Bielskis | 426/573 |
| 4,925,689 | 5/1990 | Getman | 426/289 |
| 5,013,575 | 5/1991 | Stadler et al. | 426/639 |
| 5,024,066 | 6/1991 | Goavec | 62/306 |
| 5,048,405 | 9/1991 | Takahashi et al. | 99/470 |
| 5,079,012 | 1/1992 | Lengerich et al. | 426/72 |
| 5,084,295 | 1/1992 | Whelan et al. | 426/565 |
| 5,198,261 | 3/1993 | Sasaki et al. | 426/643 |
| 5,208,050 | 5/1993 | Ney | 426/202 |
| 5,215,777 | 6/1993 | Asher et al. | 426/565 |
| 5,262,190 | 11/1993 | Cunningham et al. | 426/549 |
| 5,283,070 | 2/1994 | Bertrand et al. | 426/249 |
| 5,350,231 | 9/1994 | Eioruber | 366/85 |
| 5,417,992 | 5/1995 | Rizvi et al. | 426/283 |
| 5,425,958 | 6/1995 | Fazio et al. | 426/101 |
| 5,435,781 | 7/1995 | Fels et al. | 62/343 |
| 5,439,695 | 8/1995 | MacKey | 426/516 |
| 5,486,372 | 1/1996 | Martin et al. | 426/565 |

FOREIGN PATENT DOCUMENTS

| | | |
|---|---|---|
| 317 935 | 1/1972 | Australia . |
| 0 351 476 | 1/1990 | European Pat. Off. . |
| 0 561 118 | 1/1993 | European Pat. Off. . |
| 2538858 | 3/1977 | Germany . |
| WO 88/01473 | 3/1988 | WIPO . |

*Primary Examiner*—Cynthia L. Nessler
*Attorney, Agent, or Firm*—Pennie & Edmonds LLP

[57] ABSTRACT

The method for manufacturing frozen aerated products includes the use of a device having two endless screws, identical and parallel, meshing with each other and turning in the same direction, located in a casing fitted at one of its ends with a nozzle and at the other with a device for feeding with composition to be frozen and, in an intermediate area, with a device for feeding with air, the casing being provided with a jacket in which refrigerating fluids circulate.

9 Claims, 1 Drawing Sheet

METHOD FOR MANUFACTURING FROZEN AERATED PRODUCTS

TECHNICAL FIELD

The invention concerns frozen aerated products, a method for manufacturing same, and a device for implementing the method.

BACKGROUND ART

A conventional method for manufacturing frozen aerated products, in particular ice cream, comprises operations for mixing, homogenizing, pasteurizing, freezing and hardening the mixture to be frozen. Aeration of the mixture or expansion is carried out at the freezing stage in a proportion such that the volume increases by 70 to 120%. On leaving the freezing device or freezer, the temperature of the aerated mass is typically −5 to −6° C. This is then hardened at −40 to −45° C. in a hardening chamber, until the core temperature of the product reaches −18° C. or less for bulk products or −30° C. for extruded products as bars.

Attempts have been made to lower the temperature of the mass on leaving the freezer, for reasons of energy saving and with the aim of improving its texture, for example in the sense of greater smoothness. However, with conventional equipment, insurmountable problems of high viscosity of the mass of ice cream at temperatures below −7 to −8° C. are encountered. These problems have been in part resolved by using two scraped surface freezers in series, the first, which is conventional, delivering aerated ice cream at around −7° C. and the second, being specially designed to process the highly viscous mass so as to lower its temperature to around −10° C.

Similarly, EP-A-0561118 describes a three-stage method for producing ice cream at low temperature, down to around −20° C. This is an output temperature at which the hardening stage can be completely eliminated for bulk products and appreciably shortened for extruded products. In the first, so-called pre-expansion, stage, air is incorporated into the mixture to be frozen at a positive temperature. In the second, the aerated mass is cooled in a scraped surface exchanger, emerging at around −6° C. During the third, a screw device cools the mass to around −20° C.

U.S. Pat. No. 5,024,066 concerns a two-stage system. In the first, a pre-expansion takes place during which air is added to the mass to be frozen at a positive temperature. In the second, the aerated mass is cooled, by means of an Archimedes screw with a roughened surface fitted with scraper blades on its periphery, to a sufficiently low negative temperature to ensure that the frozen mass has a stable texture, allowing the products to be stored directly in cold store.

SUMMARY OF THE INVENTION

The aim of the present invention is to carry out the operations of expansion and cooling of the mass to be frozen in one stage only in a single device, which is easier to control and of smaller size than the known devices, and thus to simplify the low-temperature freezing method while taking advantage of the energy and texture benefits mentioned previously.

The invention concerns a method for manufacturing frozen aerated products, in which a composition to be frozen is mixed, aerated, frozen and cooled to a temperature equal to or less than −8° C., and passed through a nozzle, characterised in that these operations take place in one stage only in a single device composed of two parallel endless screws, turning in the same direction while meshing with each other and located in a casing fitted with aeration and cooling means.

It has been noted with surprise that it was possible to aerate, mix, cool and extrude a composition for ice confectionery in a single stage while obtaining a frozen aerated product at low temperature of improved and stable texture whereas one might have feared that the texture of the frozen composition might be impaired during processing in a twin-screw device. This is not obvious, since the known methods make provision for the aeration to take place prior to cooling in a separate device and for the cooling resulting in freezing to be carried out at least partially in a device equipped with scraper blades.

DETAILED DESCRIPTION OF THE INVENTION

Figure 1:
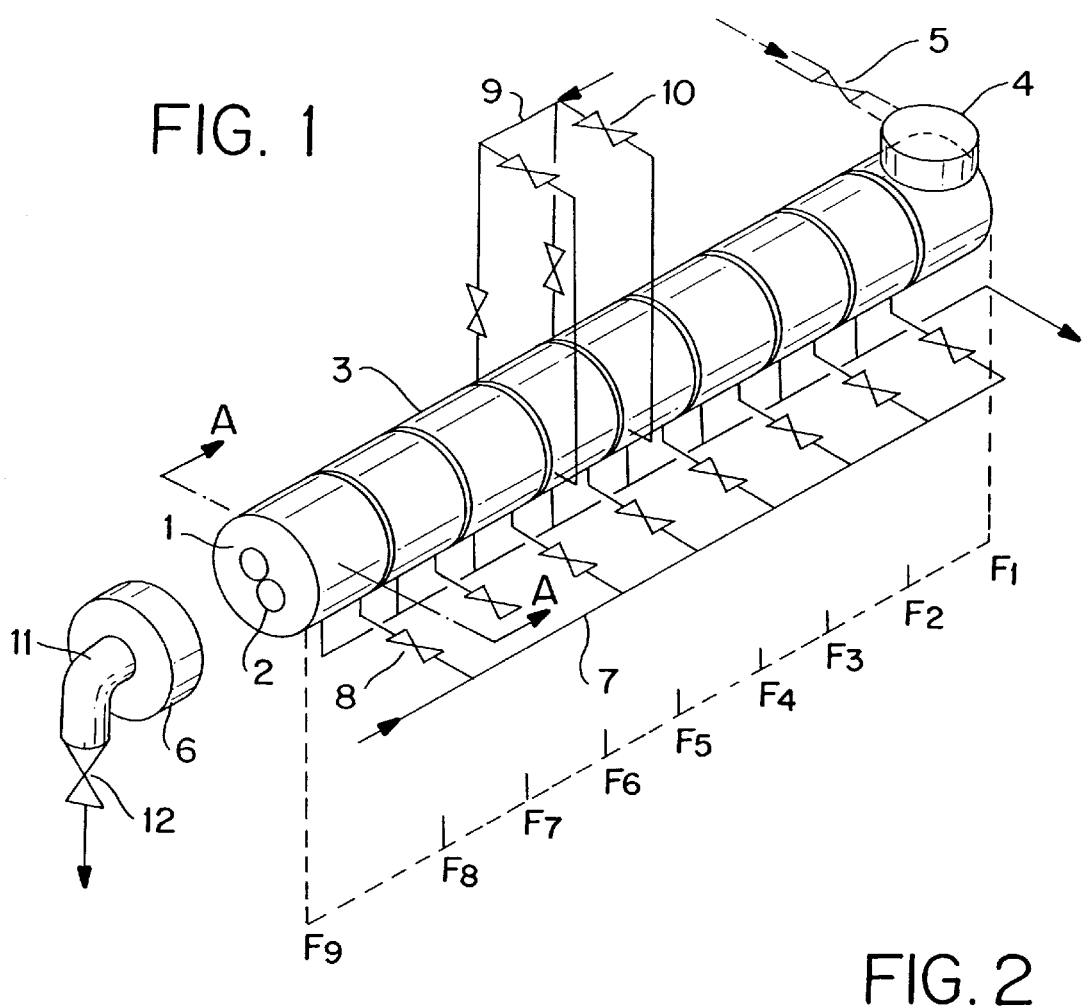
FIG. 1 is an exploded schematic view of a device in accordance with the present invention.

In order to use the method, a composition for ice confectionery is prepared in a conventional manner, for ice cream, low fat ice cream or sorbet based, according to the recipe, on milk, skimmed milk, cream, condensed milk, milk powder or butter oil, to which is added sucrose, glucose, fruit dextrose, fruit pulp and stabilizing hydrocolloids such as, for example, carrageenates, alginates, carob gum, emulsifiers such as, for example, partial glycerides and flavourings. After intimate mixing of the ingredients in the proportions dictated by the recipe, pasteurizing, cooling, then hot homogenizing under pressure conditions are carried out, allowing a reduction of the mean fat globule size to around 8–20 microns. After cooling the homogeneous mass to a low temperature, close to 0° C., the composition is allowed to mature for some time at this temperature. Homogenizing and maturing are optional steps.

This matured mass is referred to in the remainder of the description as the "mass to be frozen". It is introduced, preferably at around 2–5° C., into a twin-screw freezing device, which will be described in more detail below, in which it is mixed by the co-rotating screws turning at high speed, preferably at 100–600 r/min, conveyed to an air injection area where it is expanded to 20–150% overrun, highly cooled, to −8 to −20° C., and then forced through a nozzle.

The work in the twin-screw device is surprisingly carried out without excessive shearing, so that the rise in pressure does not exceed around 50 bar at the nozzle. The product emerging is characterised by a mean ice crystal diameter of 10 to 30 microns, which is appreciably lower than can be obtained with conventional freezers, and by a mean fat globule size of around 8–20 microns. The result of this is an improved texture in the sense of greater smoothness and greater creaminess.

The invention also concerns a device for implementing the above method, comprising two endless screws, identical and parallel, meshing with each other and turning in the same direction, located in a casing fitted at one of its ends with an extrusion nozzle and at the other with means for feeding with the composition to be frozen and, in an intermediate area, with means for feeding with air, the casing being provided with a jacket in which refrigerating fluids circulate.

The two endless screws may have successive segments where the form of the screws varies from one segment to another, for example from the point of view of the orientation of the threads and their pitch. The configuration of the screws is arranged to effect the transport, mixing, cutting and compressing operations of the mass towards the nozzle and to promote the incorporation of gas so as to obtain good expansion. Provision may be made for intermediate areas for stirring, for example by means of mono-lobed and bi-lobed discs with positive orientation, having a conveying effect, or negative orientation, having a backing-up effect, or a segment with reverse screw pitch inducing a backing-up.

The casing is fitted with cooling means composed of a double envelope with, preferably, an independent cooling circuit per segment, with valves for controlling the flow rate of refrigerating agent which allows individual temperature regulation of each segment.

Air may be injected by means of flow meters through pipes at different points on the casing, and preferably in the second half of its length, and preferably on each side of the latter. In this way, preferably, 80 to 150% overrun may be achieved.

The nozzle is, preferably, in the form of a counter-cone, the function of which is to combine the spaces surrounding each screw into a single output aperture. Its output may be horizontal or vertical. The geometry and dimensions of the nozzle or, where applicable, the diameter and length of any output pipe which may be associated with it, are designed to provide a back pressure of around 4 to 50 bar, and preferably 4 to 25 bar. The back pressure may be adjusted by means of, for example, a ball valve downstream of the pipe in question, for example in the case of an output temperature of the product close to the low limit, in which case the diameter of the output pipe must be increased to compensate for the drop in pressure due to the head loss caused by the increase in viscosity when the temperature of the mass falls. The nozzle may, preferably, be cooled, for example by means of a jacket in which a cooling fluid circulates.

The device according to the invention is described in more detail below with reference to the accompanying drawing, given by way of example.

As may be seen in FIG. 1, the device comprises two extrusion screws 1 and 2, identical and parallel, rotating about their axis and turning in the same direction, driven by a motor, not shown. The screws 1 and 2 are mounted in a casing 3, which has at its start a pipe 4 for feeding with composition to be frozen provided with a non-return valve 5 to ensure an air seal and which ends with a nozzle 6 in plate form.

The casing comprises nine 100 mm long segments F1 to F9, modifiable from the screw configuration point of view, associated with which are individual cooling circuits 7 for corresponding jackets carrying a water-alcohol mixture, with individual adjustment of the flow rate by means of valves 8. Aeration takes place through the air inlets 9 on each side of the casing and the air is injected by a piston fitted with a mass flowmeter. The air flow rate is adjusted individually by valves 10.

In a variant, not shown, the nozzle 6 is provided with a jacket where a cooling fluid also circulates, the flow rate of which can be adjusted individually.

At the output end of the casing 3 and nozzle 6, a pipe 11 serves as a pre-expansion area. The pipe 11 is provided with a ball valve 12 for controlling the back pressure and the residence time of the mass in the casing.

Let L be the total length of the segments of one of the screws 1 and 2, which represents the active length of these screws, and D the diameter of one of the screws 1 and 2; the ratio L/D is of the order of 30 to 60.

Figure 2:
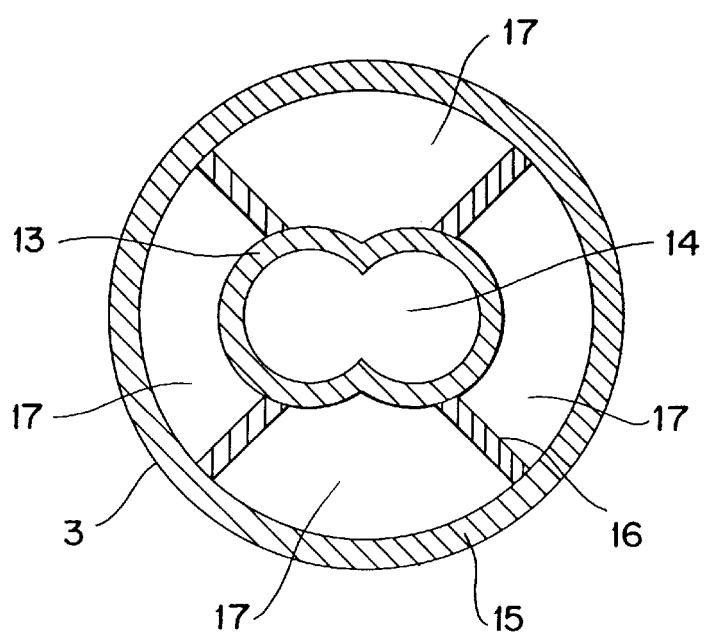
FIG. 2 is a schematic transverse section of the casing of the device of FIG. 1, taken along lines A—A thereof.

In FIG. 2, it can be seen that the casing 3 has an internal metallic envelope 13 surrounding the channel 14 for passage of the screws 1 and 2 (not shown) and an external metallic envelope 15 maintained at a distance from the envelope 13 by struts 16. A cooling fluid circulates in the channel 17 between the walls formed by the envelopes 13 and 15.

EXAMPLES

The method according to the invention is described in more detail in the examples below given by way of illustration. The percentages are by weight.

EXAMPLE 1

A composition to be frozen of low freezing point, containing 8.5% lactic fat (in the form of cream at 35% fat content), 11% non-fat milk solids, 12% sucrose, 6.4% glucose syrup (of dextrose 40 equivalent), 1% dextrose, 0.47% partial glycerides as stabilizers/emulsifiers and 0.4% vanilla flavouring, was prepared. The total solid content of the composition was 39.15%, the balance being accounted for by water. The mixture was homogenized in two stages at 135, then 35 bar, was pasteurized at 86° C. for 30 seconds, cooled to 4° C. and stored for 24 hours at this temperature. This composition was introduced into the device under the operating conditions indicated in the examples below.

Configuration of the screws 1 and 2

| Segments | F1 | F2 | F3 | F4 | F5 | F6–F7 | F8–F9 |
|---|---|---|---|---|---|---|---|
| Type of screw | T | T | T | M/C | T | CO | CO |

With T: Transport, M: Mixing C: Shearing and CO: Compression

Injection of air: at 9 from a single side in F5

Flow rate/temperature of the composition to be frozen: 11 kg/h in F1/10° C.

Inlet temperature of the refrigerating fluid:−17° C.

Rotation speed of the screws: 600 rev/min

Diameter of the nozzle (without pipe or output valve): 1.2 mm

Temperature in the casing segments and the nozzle plate:

| Segments | F1–F2 | F3 | F4–F9 | Plate 6 |
|---|---|---|---|---|
| Temperature (° C.) | +3 to +5 | −8.5 | −10 to −11 | −9 |

The temperature of the mass at the output of the nozzle 6 was −10.5° C. The overrun was 65% (increase in volume with respect to the non-aerated mass).

The product obtained had a smoother and creamier texture than the products made in a conventional manner.

EXAMPLE 2

In this example, the composition for freezing was the same as that of Example 1 and the operating conditions were as follows:

Configuration of the screws 1 and 2

| Segments     | F1 | F2  | F3  | F4  | F5 | F6–F7 | F8–F9 |
|---|---|---|---|---|---|---|---|
| Type of Screw | T  | T/M | T/M | M/C | T  | CO    | CO    |

With T: Transport, M: Mixing, C: Cutting and CO:Compression

Injection of air: at 9 from both sides in F5 and F6, that is by means of 4 pipes with a flow rate of 7.8 l/h Flow rate/temperature of the composition to be frozen: 10 kg/h in F2/10° C.

Inlet temperature of the refrigerating fluid: −25 to −28° C.

Rotation speed of the screws: 600 rev/min

Diameter of the nozzle, with pipe 11 and outlet valve 12: 10 mm

Temperature in the casing segments and the nozzle plate:

| Segments         | F1–F2    | F3      | F4–F9     | Plate 6 |
|---|---|---|---|---|
| Temperature (° C.) | +8 to +12 | −8 to −9 | −10 to −14 | −12     |

The temperature of the mass at the outlet of the nozzle 6 was −8 to −10° C. The overrun was 80 to 100%. The mean ice crystal diameter measured by optical microscopy at −10° C. and at 1000–1500 magnification was 25 microns. The mean fat globule diameter measured by laser scanning was 11.3 microns.

The product obtained had a smoother and creamier texture than the products made in a conventional manner.

EXAMPLES 3–6

It was proceeded with the same composition for freezing as in Example 1, with the screw configuration and under the same conditions as in Example 2, apart from:

The flow rate of the composition to be frozen: 9.5 kg/h,

The temperature in the segment F2: 4.5 to 5.5° C.,

The temperature of the refrigerating fluid at the inlet of the casing cooling circuit: −26.5 to −27.5° C.

Another difference was that the rotation speed of the screws was varied, as shown below. The following parameters were recorded for the products emerging:

| Example | 3 | 4 | 5 | 6 |
|---|---|---|---|---|
| Speed (r/min) | 600 | 300 | 200 | 100 |
| Output Temperature (° C.) | −8.5 | −10 | −11 | −12.2 |
| Overrun (%) | 90 | 90 | 85 | 80 |
| Pressure at plate 6 (bar) | 2 | 7 | 11 | 23 |

The mean ice crystal diameter measured by optical microscopy at −10° C. and at 1000–1500 magnification (Dc, microns) and the mean fat globule diameter measured by laser scanning (Dg, microns) obtained were:

| Example | 3 | 5 | 6 |
|---|---|---|---|
| Dc | 13 | 26 | 19 |
| Dg | 8.44 | 17.17 | 14.02 |

In every case, the products obtained had a smoother and creamier texture than the products made in a conventional manner.

EXAMPLES 7–8

It was proceeded with the same composition for freezing as in example 1, with the screw configuration and under the same conditions as in Example 2, apart from:

The flow rate of the composition to be frozen: 9.5 kg/h,

The temperature in the segment F2: 3° C.,

The temperature of the refrigerating fluid at the inlet of the casing cooling circuit: −25.9 to −27.1° C., The rotation speed of the screws, that is 600 r/min in Example 7 and 100 r/min in Example 8, at the outlet of the nozzle, a pipe 11 of 20 mm diameter and a ball valve 12.

In the case of Example 7, the outlet temperature of the product was −8.4° C. and the overrun 90%.

In the case of Example 8, the outlet temperature of the product was −12.4° C., the overrun 80% and the pressure at the nozzle 9 bar. The mean ice crystal diameter measured by optical microscopy at −10° C. and at 1000–1500 magnification (Dc, microns) and the mean fat globule diameter measured by laser scanning (Dg, microns) obtained were:

| Example | 7 | 8 |
|---|---|---|
| Dc | 23 | 24 |
| Dg | 10.35 | 13.35 |

In every case, the products obtained had a smoother and creamier texture than the products made in a conventional manner.

EXAMPLE 9

This was conducted under the conditions of Example 7, apart from the following characteristics:

Configuration of the screws 1 and 2

| Segments     | F1 | F2  | F3  | F4  | F5  | F6–F7 | F8–F9 |
|---|---|---|---|---|---|---|---|
| Type of Screw | T  | T/M | T/M | M/C | M/C | CO    | CO    |

With T: Transport, M: Mixing, C: Shearing and CO: Compression

Injection of air: at 9 from both sides in F5 and F6, that is by means of 4 pipes with a flow rate of 9.9 l/h.

The outlet temperature of the product was −8.5° C. and the overrun 100%.

The mean ice crystal diameter measured by optical microscopy at −10° C. and at 1000–1500 magnification was 26 microns.

The mean fat globule diameter measured by laser scanning was 8.82 microns.

EXAMPLES 10–11

In these examples, where a composition for freezing prepared in the same way as Example 1 was used, the following operating conditions were applied:

Configuration of the screws 1 and 2

| Segments     | F1 | F2  | F3  | F4  | F5 | F6 | F7   | F8   | F9 |
|---|---|---|---|---|---|---|---|---|---|
| Type of Screw | T  | T/M | T/M | M/C | T  | CO | M/CO | M/CO | CO |

With T: Transport, M: Mixing, C: Shearing and CO:Compression

For example 10:

quantity of incoming product 10 kg/h

Injection of air: through 9 of the 2 sides in F5 and F6, by means of 4 conduits with a flow of 12 g/h Rotating speed of the screw: 300 r/min Cooling of areas F2 to F9 by means of a freezing liquid to −30/−35° C.

The exiting temperature of the product was 11.5° C. with a 100% overrun.

For example 11:

Quantity of incoming product 10 kg/h

Injection of air: through 9 of the 2 sides in F5 and F6, by means of 4 conduits with a flow of 13 g/h Rotating speed of the screw: 100 r/min Cooling of areas F2 to F9 by means of a freezing liquid to −30/−35° C.

The exiting temperature of the product was 14.5° C with a 90% overrun.

The products obtained had a smoother and creamier texture than the products made in a conventional manner taken as a reference.

Accellerated ageing was created by means of thermal shocks in a heated stove, programmed with a cycle of temperatures simulating the conditions to which these products are subjected during their distribution in the chain from freezer to the consumer.

The mean diameter of the ice crystals measured by optical microscopy at −10° C. was up to 1000–1500 (Dc, microns) and the mean diameter of the fat globules measured by laser scanning (Dg, microns) obtained was:

| Example | 10 | 11 |
|---|---|---|
| Dc before ageing | 18 | 19 |
| Dc after ageing | 57 | 77 |
| Dg | 4.37 | 7.89 |

As a comparison, the corresponding values for the reference were:

Dc before ageing: 28,

Dc after ageing: 94,

Dg: 0.91.

Knowing that the destabilisation of the fats contributes to the fatty perception of an ice cream, it is noted that in those ice creams prepared according to the invention, the level of destabilisation of the fats was always greater than in the case of conventional products.

EXAMPLE 12

In this example, a mixture of low fat ice cream, containing 5% fats, was used. The preparation consisted of mixing 14.28% cream with a 35% fat content, 8% non fatty milk solids, 15% saccharose, 3.303% glucose syrup (dextrose equivalent 40), 1% dextrose, 0.5% partial glycerides as stabilisers/emulsifiers and 0.4% vanilla essence. The total percentage of the solids in the composition was 33.06%, the rest was water. The mixture was then homogenised in 2 stages at 224, then 40 bar, it was then pasteurised at 86° C. for 30 s, it was cooled at 4° C. and stored for 24 h at this temperature.

This mixture was placed in the freezing device in the same operating conditions and configuration of screw as those given for Example 10. The temperature of the mass upon its emergence from the extruder was −11.5° and overrun was 100%.

The ice cream with a low fat content had a very creamy texture. The freshly prepared product as well as that which had undergone accelerated ageing were compared with other referenced products which had been subjected to similar constraints. The tasters found that the products freshly prepared according to the invention gave a slight sensation of cold, had a fattier texture and had less crystals.

The mean diameter of the ice crystals measured by optical microscopy at −10° C. was up to 1000–1500 (Dc, microns) and the mean diameter of the fat globules measured by laser scanning (Dg, microns) obtained was:

|  | Example 12 | Reference |
|---|---|---|
| Dc before ageing | 18 | 24 |
| Dc after ageing | 67 | 81 |

EXAMPLES 13–16

In these Examples some mixtures for sorbet were prepared in the following manner: To a mixture at 60° C. of 0.8% stabilisers (gelatine, carob gum), was added 29% sugar, 10% glucose syrup and 35% unsweetened puree of raspberries, a colouring and a raspberry flavouring as well as a food grade acid of up to pH 3.2–3.4. The solid content of the composition was 30.30%, the rest being water. The mixture was homogenised at 72° C. in one stage at a pressure of 50 bar, it was then pasteurised at 85° C. for 30 min., cooled at 4° C. and left standing for at least 4 h at that temperature.

The mixture for freezing was introduced into the device with the same configuration of screw as that in Example 10. The operating conditions were the same as those for Example 10, apart from the following:

Injection of air: in 9 of the two sides in F5 and F6, being by 4 conduits with an outflow of 2, 5, 12 and 15 g/lh.

Screw rotation speed: of 100 and 300 r/min.

The following parameters were taken for the emerging products:

| Example | 13 | 14 | 15 | 16 |
|---|---|---|---|---|
| Air Flow (g/h) | 2 | 5 | 12 | 15 |
| Speed (r/min) | 100 | 100 | 100 | 300 |
| Exiting temperature (° C.) | −16 | −16 | −16.5 | −10.5 |
| Overrun (%) | 24 | 40 | 92 | 150 |

The textures of the products obtained reminded one of those of ice creams, despite the total absence of fat.

The taste comparison with a sorbet of the same composition prepared in the conventional manner, gave it a less cold character, the merest hint of crystals, the greatest sensation of fats and the least roughness of the sorbets prepared according to the invention, both for the freshly prepared products as well as for those which had already undergone ageing.

EXAMPLES 17–19

Example 17: It was proceeded in Example 10 with homogenisation, but the maturation stage was cut out.

Example 18: It was proceeded in Example 10, but the homogenisation stage was cut out.

Example 19: It was proceeded in Example 10, but the homogenisation and maturation stages were both cut out.

Tastings of the newly prepared products as well as structural measures (size of crystals, destabilisation of the fats) on products freshly prepared and after ageing showed only minor differences in relation to the same products which had been put through homogenisation and maturation.

In the preceeding Examples, the method and the device were described in relation to the manufacture of iced mixtures without specifying that one could also process by co-extruding, various ice creams or different coloured and flavoured sorbets and thus obtain composite products, for example marbled.

Of course, the method would be applicable to the manufacture of frozen products such as mousses, creams and sweet or savoury spreads, for example of cheese, vegetables, meat or fish or with sauces or salad dressings. In these cases, the flexibility of the method allows the adaptation of the incorporation of air in the mixture to be frozen more or less in keeping with the degree of overrun required relative to the characteristics of the types of products desired.

We claim:

1. In a method for manufacturing frozen, aerated, liquid based food products, in which a liquid based composition to be frozen is mixed, aerated, frozen and cooled to a temperature at least as low as about −8° C., the improvement comprising the steps of;

mixing, aerating, freezing and cooling the composition, in one stage only, in a single device having two parallel endless screws oriented in meshing relation with each other and located in a casing fitted with aeration and cooling means and an outlet nozzle;

turning the screws in the same direction to transport the composition through said casing and effect mixing thereof;

aerating, freezing and cooling the composition by said aeration and cooling means as it is fed through said casing; and passing the composition through said nozzle.

2. In a method for manufacturing frozen, aerated, liquid based food products, in which a liquid based composition to be frozen is mixed, aerated, frozen and cooled to a temperature equal to or less than −8° C., and passed through an outlet nozzle, the improvement which comprises conducting these operations in one stage only of a single device having two parallel endless co-rotating screws, turning in the same direction while meshing with each other and located in a casing fitted with aeration and cooling means.

3. The method according to claim 2, wherein the composition to be frozen is introduced at about 2–5° C. into the device, in which it is mixed by the co-rotating screws turning at about 100–600 r/min, conveyed to an air injection area where it is expanded to about 20–150% overrun, cooled to about −8 to −20° C., and then forced through the outlet nozzle.

4. The method according to claim 2 wherein the nozzle is fitted at one end of the casing to define a die, the other end of the casing is fitted with means for feeding the composition to be frozen and an intermediate area of the casing is fitted with means for feeding air, with the casing further being provided with a jacket in which refrigerated fluids circulate, the two endless screws presenting successive segments wherein L being the total length of the segments of one screw and D the diameter of one screw, the relation L/D is about 30–60 and the screws comprise intermediate areas for mixing by means of mono-lobe or bi-lobe discs with a positive orientation, having a conveying effect, or negative orientation, having a backing-up effect, or a segment with reverse screw pitch inducing a backing up of the material to be frozen.

5. The method according to claim 4, wherein the shape of the screws varies from one segment to the other, from the point of the orientation of the die and of their movement, and the configuration of the screws is designed to effect the operations of transport and mixing, shearing and compression of the mass towards the die and to promote the incorporation of gas so as to obtain a good overrun.

6. The method according to claim 4, wherein the nozzle is equipped with cooling means made up of a double envelope with an autonomous cooling circuit per segment, and wherein the die is, where necessary, equipped with cooling means, and with a safety valve for controlling the distribution of a freezing agent, which permits an individual regulation of each segment and, where necessary, the temperature of the die.

7. The method according to claim 4, wherein the air is injected by means of conduits positioned at different levels of the casing at ½ to ⅘ of its length.

8. The method according to claim 4, wherein the die is in the form of a counter-cone, the function of which is to combine the spaces surrounding each screw into a single outlet pipe and wherein the outlet nozzle is vertical or horizontal.

9. The method according to claim 8, wherein the diameter and length of the pipe are designed to provide a back pressure of 4 to 50 bar and wherein a device downstream of the pipe adjusts the back pressure.

* * * * *